(12) United States Patent
Raut et al.

(10) Patent No.: US 12,233,483 B2
(45) Date of Patent: Feb. 25, 2025

(54) LOW TEMPERATURE SOLDERING SOLUTIONS FOR POLYMER SUBSTRATES, PRINTED CIRCUIT BOARDS AND OTHER JOINING APPLICATIONS

(71) Applicant: ALPHA ASSEMBLY SOLUTIONS INC., Waterbury, CT (US)

(72) Inventors: Rahul Raut, Waterbury, CT (US); Nirmalyakumar Chaki, Waterbury, CT (US); Bawa Singh, Waterbury, CT (US); Ranjit Pandher, Waterbury, CT (US); Siuli Sarkar, Waterbury, CT (US)

(73) Assignee: Alpha Assembly Solutions Inc., Waterbury, CT (US)

( * ) Notice: Subject to any disclaimer, the term of this patent is extended or adjusted under 35 U.S.C. 154(b) by 702 days.

(21) Appl. No.: 17/286,704

(22) PCT Filed: Oct. 23, 2019

(86) PCT No.: PCT/EP2019/025358
§ 371 (c)(1),
(2) Date: Apr. 19, 2021

(87) PCT Pub. No.: WO2020/083529
PCT Pub. Date: Apr. 30, 2020

(65) Prior Publication Data
US 2021/0283727 A1    Sep. 16, 2021

(30) Foreign Application Priority Data

Oct. 24, 2018 (IN) .............. 201811040134

(51) Int. Cl.
| | | |
|---|---|---|
| *B23K 35/02* | (2006.01) | |
| *B23K 35/26* | (2006.01) | |
| *B23K 35/362* | (2006.01) | |
| *C22C 12/00* | (2006.01) | |
| *B23K 101/42* | (2006.01) | |
| *B23K 103/08* | (2006.01) | |

(52) U.S. Cl.
CPC .......... *B23K 35/264* (2013.01); *B23K 35/025* (2013.01); *B23K 35/362* (2013.01); *B23K 2101/42* (2018.08); *B23K 2103/08* (2018.08)

(58) Field of Classification Search
CPC .... C22C 12/00; B23K 35/264; B23K 35/025; B23K 2103/08; B23K 35/362
See application file for complete search history.

(56) References Cited

U.S. PATENT DOCUMENTS

| | | | | |
|---|---|---|---|---|
| 5,074,928 A | * | 12/1991 | Sanji | ................ B23K 35/3616 |
| | | | | 148/23 |
| 5,755,896 A | * | 5/1998 | Paruchuri | ............ B23K 35/264 |
| | | | | 148/400 |
| 5,833,921 A | | 11/1998 | Paruchuri et al. | |
| 8,410,377 B2 | | 4/2013 | Yamaguchi et al. | |
| 2008/0053571 A1 | * | 3/2008 | Yamamoto | ........... B23K 35/025 |
| | | | | 148/23 |
| 2010/0147567 A1 | | 6/2010 | Hino et al. | |
| 2016/0318134 A1 | | 11/2016 | Ribas et al. | |
| 2017/0197281 A1 | | 7/2017 | Choudhury et al. | |

FOREIGN PATENT DOCUMENTS

| | | | |
|---|---|---|---|
| CN | 105195915 A | 12/2015 | |
| CN | 105215569 A | 1/2016 | |
| DE | 19647478 C1 | 6/1997 | |
| EP | 0845324 A1 | 6/1998 | |
| EP | 1317991 A2 | 6/2003 | |
| EP | 1416508 A1 | 5/2004 | |
| EP | 1897652 A1 | 3/2008 | |
| EP | 1914035 A1 | 4/2008 | |
| EP | 2052805 A1 | 4/2009 | |
| EP | 2623253 A1 | 8/2013 | |
| EP | 2671667 A1 | 12/2013 | |
| EP | 2689885 A1 | 1/2014 | |
| EP | 2868423 A1 | 5/2015 | |
| EP | 2979807 A1 | 2/2016 | |
| EP | 3165323 | 5/2017 | |
| JP | H08150493 A | 6/1996 | |
| JP | H11221695 A | 8/1999 | |
| JP | 2001358459 A | 12/2001 | |
| JP | 2007326124 A | 12/2007 | |
| JP | 2010077265 A | 4/2010 | |
| WO | 2012/118074 A1 | 9/2012 | |
| WO | 2014/034139 A1 | 3/2014 | |
| WO | 2016/012754 A2 | 1/2016 | |
| WO | WO-2016144945 A1 * | 9/2016 | ............ B22F 1/0059 |
| WO | 2016/178000 A1 | 11/2016 | |

* cited by examiner

*Primary Examiner* — Jessee R Roe
(74) *Attorney, Agent, or Firm* — Stinson LLP (57) ABSTRACT

A solder alloy comprising: from 40 to 65 wt. % bismuth; from I to IO wt. % indium; at least one of: from 0.1 to 5 wt. % gallium, from 0.1 to 5 wt. % zinc, from 0.1 to 2 w. % copper, from 0.01 to 0.1 wt. % cobalt, from 0.1 to 2 wt. % silver, from 0.005 to 0.05 wt. % titanium, and from 0.01 to 1 wt. % nickel; optionally up to 1 wt. % of one or more of: vanadium, rare earth metals, neodymium, chromium, iron, aluminium, phosphorus, gold, tellurium, selenium, calcium, vanadium, molybdenum, platinum, magnesium, silicon, and manganese; and the balance tin together with any unavoidable impurities.

23 Claims, 2 Drawing Sheets

LOW TEMPERATURE SOLDERING SOLUTIONS FOR POLYMER SUBSTRATES, PRINTED CIRCUIT BOARDS AND OTHER JOINING APPLICATIONS

The present invention relates generally to the field of metallurgy, and more particularly to a solder alloy and solder paste. The solder alloy is particularly, though not exclusively, suitable for use in electronic soldering applications such as wave soldering, surface mounting technology, hot air leveling and ball grid arrays, land grid arrays, bottom terminated packages, LEDs and chip scale packages.

Wave soldering (or flow soldering) is a widely used method of mass soldering electronic assemblies. It may be used, for example, for through-hole circuit boards, where the board is passed over a wave of molten solder, which laps against the bottom of the board to wet the metal surfaces to be joined. Another soldering technique involves printing of the solder paste on the soldering pads on the printed circuit boards followed by placement and sending the whole assembly through a reflow oven. During the reflow process, the solder melts and wets the soldering surfaces on the boards as well as the components. Another soldering process involves immersing printed wiring boards into molten solder in order to coat the copper terminations with a solderable protective layer. This process is known as hot-air leveling. A ball grid array joint or chip scale package is assembled typically with spheres of solder between two substrates. Arrays of these joints are used to mount chips on circuit boards.

Typically, polyimide (PI) has been the substrate of choice for printed circuit boards (PCBs) because of its high temperature stability above 300° C. This enables use of tin-silver-copper (SAC) solder pastes that melt at 218° C. These PI-based circuit boards are typically soldered at peak temperatures of 240° C.-260° C. Compared to PI, polyethylene terephthalate (PET) films are significantly lower in cost. However, PET Films cannot be used and soldered at these high temperatures because of heat distortion and thermal breakdown. Thus lower temperature soldering temperatures are required if PET-based films need to be used as a substrate.

For ease of handling and placing, solder alloys are typically employed in a solder paste. A solder paste typically contains an organic paste vehicle (paste flux) and solder powder (alloy). The role of the paste flux is to provide printing performance and stability of the paste along with coalescence of solder particles at given reflow conditions. Typically, a solder paste flux comprises the following building blocks: rosin/resins, a solvent package, an activator package, additives, rheology modifying agents and corrosion inhibitors. Conventional solder fluxes would not be suitable for use with a low temperature solder alloy. This is because most of the activators commonly employed in solder pastes tend to be activated at higher temperatures (i.e. before the solder melts). One pathway is to achieve the required activity at lower temperatures is to select very aggressive activators. However, such a solution is unfavourable because highly aggressive activators disturb the paste homogeneity by reacting with the solder alloys in storage. Furthermore, any unreacted activators remaining in the post reflow residue can adversely affect the electrical reliability.

There is a need for a solder alloy having a lower melting point than that of conventional solder alloys, but with similar or more favourable mechanical and thermal properties. In addition, there is a need for a solder alloy capable of being soldered on a PET substrate. Furthermore, there is a need for a solder flux suitable for use with such a solder alloy to form a solder paste.

The present invention aims to solve at least some of the problems associated with the prior art or to provide a commercially acceptable alternative.

Accordingly, in a first aspect, the present invention provides a solder alloy comprising:
from 40 to 65 wt. % bismuth;
from 1 to 10 wt. % indium;
at least one of:
   from 0.1 to 5 wt. % gallium,
   from 0.1 to 5 wt. % zinc,
   from 0.1 to 2 w. % copper,
   from 0.01 to 0.1 wt. % cobalt,
   from 0.1 to 2 wt. % silver,
   from 0.005 to 0.05 wt. % titanium, and
   from 0.01 to 1 wt. % nickel;
optionally one or more of:
   up to 1 wt. % germanium,
   up to 1 wt. % rare earth metals,
   up to 1 wt. % neodymium,
   up to 1 wt. % chromium,
   up to 1 wt. % iron,
   up to 1 wt. % aluminium,
   up to 1 wt. % phosphorus,
   up to 1 wt. % gold,
   up to 1 wt. % tellurium,
   up to 1 wt. % selenium,
   up to 1 wt. % calcium,
   up to 1 wt. % vanadium,
   up to 1 wt. % molybdenum,
   up to 1 wt. % platinum,
   up to 1 wt. % magnesium,
   up to 1 wt. % silicon, and
   up to 1 wt. % manganese; and
the balance tin together with any unavoidable impurities.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The term "solder alloy" used herein encompasses a fusible metal alloy with a melting point in the range of from 90 to 400° C. The alloys are preferably lead-free and/or antimony-free meaning that no lead and/or antimony is added intentionally. Thus, the lead and antimony contents are zero or at no more than accidental impurity levels.

The solder alloy may exhibit a combination of low reflow temperature and favourable mechanical properties. For example, typically the solder alloy may be soldered at a temperature of less than 170° C., more typically less than 150° C., even more typically below 140° C. Accordingly, the solder alloy may be capable of carrying out solder reflow on low temperature substrates and may reduce reflow-induced warpage of conventional substrates and components. Such low temperature substrates may comprise, for example, PET or heat-stabilised PET. PET substrates are lower cost than conventional PI substrates (typically $9/sqm versus $90/sqm), and may also exhibit increased flexibility. Furthermore, PET circuit boards can be water clear (i.e. transparent), whereas PI films are typically yellow-orange, meaning that the solder alloy and PET substrate are particularly suitable for use in, for example, displays, lighting, smart packaging and smart labels. In addition, the solder alloy and PET substrate may be particularly suitable in applications in which the "arc resistance" property of PET is desired.

The solder alloy may act as a replacement for conventional electrically conductive adhesives (ECAs).

The solder alloy may exhibit favourable wetting characteristics, for example wetting characteristics substantially similar to or better than those of conventional solder alloys such as, for example SAC solder alloys.

The solder alloys may exhibit suitable mechanical and physical stability for electronic components attached on to printed circuit boards, in particular flexible polymer substrates. In addition, the solder alloys may exhibit acceptable levels of thermo-mechanical reliability suitable for flexible circuit applications.

The indium may serve to reduce the reflow temperature of the solder alloy. Surprisingly, it has been found that the addition of at least one of gallium, zinc, copper, cobalt, silver, titanium and nickel in the recited amounts does not substantially change the melting behavior of the solder, but can change the bulk alloy properties by modifying the solidification dynamics. Advantageously, it has been found that when the indium is added to the base alloy in the recited amount in combination with at least one of gallium, zinc, copper, cobalt, silver, titanium and nickel, the reduced reflow temperature is exhibited with only a small decrease, typically substantially no decrease, in the favourable soldering properties and mechanical properties of the base alloy. This is surprising since indium is known to decrease the favourable properties of a solder alloy, for example its mechanical properties, solderability and propensity to oxidation.

The solder alloy comprises from 40 to 65 wt. % bismuth. Preferably, the solder alloy comprises from 42 to 60 wt. % bismuth, more preferably from 45 to 59 wt. % bismuth, even more preferably from 47 to 58.5 wt. % bismuth, still even more preferably from 50 to 58 wt. % bismuth, still even more preferably from 55 to 57.5 wt. % bismuth. In a preferred embodiment, the solder alloy comprises from 50 to 55 wt. % bismuth. In another preferred embodiment, the solder alloy comprises from 56 to 59 wt. % bismuth. In another preferred embodiment the solder alloy comprises from 43 to 47 w. % bismuth. The presence of bismuth in the specified amount may serve to improve mechanical properties through solid solution strengthening. Bismuth may also act to improve creep resistance. Bismuth may also improve wetting and spread.

The solder alloy comprises from 1 to 10 wt. % indium. Preferably, the solder alloy comprises from 1.5 to 9 wt. % indium, more preferably from 2 to 8 wt. % indium, even more preferably from 3 to 7 wt. % indium. In a preferred embodiment, the solder alloy comprises from 2.5 to 3.5 wt. % indium, preferably about 3 wt. % indium. In another preferred embodiment, the solder alloy comprises from 3.5 to 4.5 wt. % indium, preferably about 4 wt. % indium. In another preferred embodiment, the solder alloy comprises from 4.5 to 5.5 wt. % indium, preferably about 5 wt. % indium. In another preferred embodiment, the solder alloy comprises from 5.5 to 6.5 wt. % indium, preferably about 6 wt. % indium. In another preferred embodiment, the solder alloy comprises from 6.5 to 7.5 wt. % indium, preferably about 7 wt. % indium. The presence of indium in the recited amounts, together with the other alloy elements, may serve to reduce the liquidus temperature of the solder alloy, thereby alloying the alloy to be reflowed at a lower temperature than the base alloy. However, greater amounts of indium may decrease the favourable properties of the solder alloy, such as its mechanical strength, solderability and long-term thermo-mechanical stability. In addition, greater amounts of indium may render the solder alloy unfavourably susceptible to oxidation.

The solder alloy optionally comprises from 0.1 to 5 wt. % gallium. It is preferable that the alloy comprises gallium. Of the at least one or more elements gallium, zinc, copper, cobalt, silver, titanium and nickel, it is preferable that the solder alloy comprises at least gallium. The solder alloy preferably comprises from 0.5 to 4 wt. % gallium, more preferably from 0.75 to 3.5 wt. % gallium, even more preferably from 1 to 3 wt. % gallium. In a preferred embodiment the solder alloy comprises from 0.5 to 1.5 wt. % gallium, preferably about 1 wt. % gallium. In another preferred embodiment the solder alloy comprises from 1.5 to 2.5 wt. % gallium, preferably about 2 wt. % gallium. Gallium may serve to decrease the liquidus temperature of the solder alloy. In addition, gallium may provide solid solution strengthening. While gallium is less effective than indium at reducing the reflow temperature, gallium may reduce the reflow temperature without substantially decreasing the favourable mechanical properties. Accordingly, a combination of indium and gallium in the recited amounts is particularly effective at providing the solder alloy with a combination of low liquidus temperature and favourable mechanical properties. The presence of gallium may also increase the stability of a solder paste comprising the solder alloy. However, greater levels of gallium may decrease the solderability of the solder alloy.

The solder alloy optionally comprises from 0.1 to 5 wt. % zinc. It is preferable that the alloy comprises zinc. The solder alloy preferably comprises from 0.5 to 4 wt. % zinc, more preferably from 1 to 3 wt. % zinc. In a preferred embodiment the solder alloy comprises from 0.5 to 1.5 wt. % zinc, preferably about 1 wt. % zinc. In another preferred embodiment the solder alloy comprises from 1.5 to 2.5 wt. % zinc, preferably about 2 wt. % zinc. Zinc may provide solid solution strengthening. Accordingly, a combination of indium and zinc in the recited amounts is particularly effective at providing the solder alloy with a combination of low liquidus temperature and favourable mechanical properties. However, greater levels of zinc may decrease the solderability of the solder alloy.

The solder alloy optionally comprises from 0.1 to 2 w. % copper. It is preferable that the alloy comprises copper. The solder alloy preferably comprises from 0.15 to 1.5 wt. % copper, more preferably from 0.18 to 0.32 wt. % copper. In a preferred embodiment, the solder alloy comprises from 0.18 to 0.32 wt. % copper, preferably from 0.2 to 0.3 wt. % copper. In another preferred embodiment the solder alloy comprises from 0.7 to 1.1 wt. % copper, preferably from 0.8 to 1 wt. % copper. The presence of copper in the specified amount may serve to improve mechanical properties, for example strength, through the formation of intermetallic compounds. In addition, the presence of copper reduces copper dissolution and may also improve creep resistance. Accordingly, a combination of indium and copper in the recited amounts is particularly effective at providing the solder alloy with a combination of low liquidus temperature and favourable mechanical properties.

The solder alloy optionally comprises from 0.01 to 0.1 wt. % cobalt. It is preferable that the solder alloy comprises cobalt. The solder alloy preferably comprises from 0.02 to 0.09 wt. % cobalt, more preferably from 0.03 to 0.08 wt. % cobalt. Cobalt may also slow the rate of IMC formation at the substrate/solder interface, and increase drop-shock resistance. Cobalt may also reduce copper dissolution. Accordingly, a combination of indium and cobalt in the recited amounts is particularly effective at providing the solder alloy with a combination of low liquidus temperature and favourable mechanical properties.

The solder alloy optionally comprises from 0.1 to 2 wt. % silver. It is preferable that the solder alloy comprises silver. The solder alloy preferably comprises from 0.2 to 1.5 wt. % silver, more preferably from 0.3 to 1.2 wt. % silver. In a preferred embodiment, the solder alloy comprises from 0.1 to 0.4 wt. % silver, preferably from 0.2 to 0.3 wt. % silver. In another preferred embodiment the solder alloy comprises from 0.7 to 1.1 wt. % silver, preferably from 0.8 to 1 wt. % silver. The presence of silver in the specified amount may serve to improve mechanical properties, for example strength, through the formation of intermetallic compounds. In addition, the presence of silver may act to improve wetting and spread. Accordingly, a combination of indium and silver in the recited amounts is particularly effective at providing the solder alloy with a combination of low liquidus temperature and favourable mechanical properties.

The solder alloy optionally comprises from 0.005 to 0.05 wt. % titanium. It is preferable that the solder alloy comprises titanium. The solder alloy preferably comprises from 0.055 to 0.045 wt. % titanium, more preferably from 0.01 to 0.04 wt. % titanium. The presence of titanium in the specified amount may serve to improve strength and interfacial reactions. Titanium may also improve drop shock performance by controlling copper diffusion at the substrate/solder interface. Accordingly, a combination of indium and titanium in the recited amounts is particularly effective at providing the solder alloy with a combination of low liquidus temperature and favourable mechanical properties.

The solder alloy optionally comprises from 0.01 to 1 wt. % nickel. It is preferable that the solder alloy comprises nickel. The solder alloy preferably comprises 0.02 to 0.9 wt. % nickel, more preferably from 0.025 to 0.8 wt. % nickel, even more preferably from 0.03 to 0.5 wt. % nickel. The presence of nickel in the specified amount may serve to improve mechanical properties through the formation of intermetallic compounds with tin, which can result in precipitation strengthening. Nickel may also increase drop shock resistance by decreasing IMC growth at the substrate/solder interface. Nickel may also reduce copper dissolution. Accordingly, a combination of indium and nickel in the recited amounts is particularly effective at providing the solder alloy with a combination of low liquidus temperature and favourable mechanical properties.

The solder alloy optionally comprises up to 1 wt. % germanium. If germanium is present, the solder alloy preferably comprises from 0.001 to 1 wt. % germanium, more preferably from 0.01 to 0.5 wt. % germanium, even more preferably from 0.1 to 0.3 wt. % germanium. The solder alloy optionally comprises up to 1 wt. % rare earth metals. If rare earth metals is present, the solder alloy preferably comprises from 0.001 to 1 wt. % rare earth metals, more preferably from 0.01 to 0.5 wt. % rare earth metals, even more preferably from 0.1 to 0.3 wt. % rare earth metals. The solder alloy optionally comprises up to 1 wt. % neodymium. If neodymium is present, the solder alloy preferably comprises from 0.001 to 1 wt. % neodymium, more preferably from 0.01 to 0.5 wt. % neodymium, even more preferably from 0.1 to 0.3 wt. % neodymium. The solder alloy optionally comprises up to 1 wt. % chromium. If chromium is present, the solder alloy preferably comprises from 0.001 to 1 wt. % chromium, more preferably from 0.01 to 0.5 wt. % chromium, even more preferably from 0.1 to 0.3 wt. % chromium. The solder alloy optionally comprises up to 1 wt. % iron. If iron is present, the solder alloy preferably comprises from 0.001 to 1 wt. % iron, more preferably from 0.01 to 0.5 wt. % iron, even more preferably from 0.1 to 0.3 wt. % iron. The solder alloy optionally comprises up to 1 wt. % aluminium. If aluminium is present, the solder alloy preferably comprises from 0.001 to 1 wt. % aluminium, more preferably from 0.01 to 0.5 wt. % aluminium, even more preferably from 0.1 to 0.3 wt. % aluminium. The solder alloy optionally comprises up to 1 wt. % phosphorus. If phosphorus is present, the solder alloy preferably comprises from 0.001 to 1 wt. % phosphorus, more preferably from 0.01 to 0.5 wt. % phosphorus, even more preferably from 0.1 to 0.3 wt. % phosphorus. The solder alloy optionally comprises up to 1 wt. % gold. If gold is present, the solder alloy preferably comprises from 0.001 to 1 wt. % gold, more preferably from 0.01 to 0.5 wt. % gold, even more preferably from 0.1 to 0.3 wt. % gold. The solder alloy optionally comprises up to 1 wt. % tellurium. If tellurium is present, the solder alloy preferably comprises from 0.001 to 1 wt. % tellurium, more preferably from 0.01 to 0.5 wt. % tellurium, even more preferably from 0.1 to 0.3 wt. % tellurium. The solder alloy optionally comprises up to 1 wt. % selenium. If selenium is present, the solder alloy preferably comprises from 0.001 to 1 wt. % selenium, more preferably from 0.01 to 0.5 wt. % selenium, even more preferably from 0.1 to 0.3 wt. % selenium. The solder alloy optionally comprises up to 1 wt. % calcium. If calcium is present, the solder alloy preferably comprises from 0.001 to 1 wt. % calcium, more preferably from 0.01 to 0.5 wt. % calcium, even more preferably from 0.1 to 0.3 wt. % calcium. The solder alloy optionally comprises up to 1 wt. % vanadium. If vanadium is present, the solder alloy preferably comprises from 0.001 to 1 wt. % vanadium, more preferably from 0.01 to 0.5 wt. % vanadium, even more preferably from 0.1 to 0.3 wt. % vanadium. The solder alloy optionally comprises up to 1 wt. % molybdenum. If molybdenum is present, the solder alloy preferably comprises from 0.001 to 1 wt. % molybdenum, more preferably from 0.01 to 0.5 wt. % molybdenum, even more preferably from 0.1 to 0.3 wt. % molybdenum. The solder alloy optionally comprises up to 1 wt. % platinum. If platinum is present, the solder alloy preferably comprises from 0.001 to 1 wt. % platinum, more preferably from 0.01 to 0.5 wt. % platinum, even more preferably from 0.1 to 0.3 wt. % platinum. The solder alloy optionally comprises up to 1 wt. % magnesium. If magnesium is present, the solder alloy preferably comprises from 0.001 to 1 wt. % magnesium, more preferably from 0.01 to 0.5 wt. % magnesium, even more preferably from 0.1 to 0.3 wt. % magnesium. The solder alloy optionally comprises up to 1 wt. % silicon. If silicon is present, the solder alloy preferably comprises from 0.001 to 1 wt. % silicon, more preferably from 0.01 to 0.5 wt. % silicon, even more preferably from 0.1 to 0.3 wt. % silicon.

The solder alloy optionally comprises up to 1 wt. % manganese. If manganese is present, the solder alloy preferably comprises from 0.001 to 1 wt. % manganese, more preferably from 0.01 to 0.5 wt. % manganese, even more preferably from 0.1 to 0.3 wt. % manganese.

The presence of manganese in the specified amount may serve to improve strength and interfacial reactions. Manganese may also improve drop shock performance. Aluminium, calcium, vanadium, magnesium, phosphorus, neodymium, silicon and vanadium may serve as deoxidisers and may improve wettability of the solder alloy. Gold, chromium, iron, molybdenum, platinum, tellurium and selenium may serve as deoxidisers and may serve to improve strength and interfacial reactions. The term rare earth element as used herein refers to one or more elements selected from Sc, Y, La, Ce, Pr, Nd, Pm, Sm, Eu, Gd, Tb, Dy, Ho, Er, Tm, Yb and Lu. Rare earths may act to improve spread and wettability. Cerium has been found to be particularly effective in this regard.

The alloy will typically comprise at least 25 wt. % tin, more typically at least 30 wt. % tin, still more typically at least 32 wt. % tin. The alloy will typically comprise up to 50 wt. % tin, more typically up to 45 wt. % tin, still more typically up to 43 wt. % tin.

It will be appreciated that the alloys described herein may contain unavoidable impurities, although, in total, these are unlikely to exceed 1 wt. % of the composition. Preferably, the solder alloys contain unavoidable impurities in an amount of not more than 0.5 wt. % of the composition, more preferably not more than 0.3 wt. % of the composition, still more preferably not more than 0.1 wt. % of the composition, still more preferably not more than 0.05 wt. % of the composition, and most preferably not more than 0.02 wt. % of the composition.

The solder alloys described herein may consist of the recite elements. Alternatively, the solder alloys described herein may consist essentially of the recited elements. It will therefore be appreciated that in addition to those elements that are mandatory (i.e. tin, bismuth, indium and at least one of gallium, zinc, copper, cobalt, silver, titanium and nickel) other non-specified elements may be present in the composition provided that the essential characteristics of the composition are not materially affected by their presence.

In a preferred embodiment, the solder alloy consists of from 50 to 54 wt. % bismuth, from 4 to 6 wt. % indium, from 0.5 to 1.5 wt. % gallium and the balance tin together with any unavoidable impurities.

In a preferred embodiment, the solder alloy consists of from 49 to 53 wt. % bismuth, from 5 to 7 wt. % indium, from 0.5 to 1.5 wt. % gallium and the balance tin together with any unavoidable impurities.

In a preferred embodiment, the solder alloy consists of from 49 to 53 wt. % bismuth, from 4 to 6 wt. % indium, from 1.5 to 2.5 wt. % gallium and the balance tin together with any unavoidable impurities.

In a preferred embodiment, the solder alloy consists of from 56 to 59 wt. % bismuth, from 0.1 to 0.3 wt. % copper, from 0.02 to 0.04 cobalt from 2 to 4 wt. % indium and the balance tin together with any unavoidable impurities.

In a preferred embodiment, the solder alloy consists of from 56 to 59 wt. % bismuth, from 0.1 to 0.3 wt. % copper, from 0.02 to 0.04 cobalt from 4 to 6 wt. % indium, from 1 to 3 wt. % gallium and the balance tin together with any unavoidable impurities.

In a preferred embodiment, the solder alloy consists of from 56 to 59 wt. % bismuth, from 0.2 to 0.6 wt. % silver, from 2 to 4 wt. % indium, and the balance tin together with any unavoidable impurities.

In a preferred embodiment, the solder alloy consists of from 56 to 59 wt. % bismuth, from 0.2 to 0.6 wt. % silver, from 4 to 6 wt. % indium, from 1 to 3 wt. % gallium and the balance tin together with any unavoidable impurities.

In a further aspect, the present invention provides a solder alloy comprising:
  from 1 to 10 wt. % bismuth;
  from 1 to 10 wt. % indium;
  at least one of:
    from 0.1 to 5 wt. % gallium,
    from 0.1 to 5 wt. % zinc,
    from 0.1 to 2 w. % copper,
    from 0.01 to 0.1 wt. % cobalt,
    from 0.1 to 2 wt. % silver,
    from 0.005 to 0.05 wt. % titanium, and
    from 0.01 to 1 wt. % nickel;
  optionally one or more of:
    up to 1 wt. % vanadium,
    up to 1 wt. % rare earth metals,
    up to 1 wt. % neodymium,
    up to 1 wt. % chromium,
    up to 1 wt. % iron,
    up to 1 wt. % aluminium,
    up to 1 wt. % phosphorus,
    up to 1 wt. % gold,
    up to 1 wt. % tellurium,
    up to 1 wt. % selenium,
    up to 1 wt. % calcium,
    up to 1 wt. % vanadium,
    up to 1 wt. % molybdenum,
    up to 1 wt. % platinum,
    up to 1 wt. % magnesium,
    up to 1 wt. % silicon, and
    up to 1 wt. % manganese; and
  the balance tin together with any unavoidable impurities.

For the avoidance of doubt, the advantages and preferable features (e.g. the elements and element contents) of the first aspect apply also to this aspect.

The solder alloy preferably comprises from 5 to 9 wt. % bismuth, more preferably from 6 to 8 wt. % bismuth, even more preferably from 6.5 to 7.5 wt. % bismuth. The presence of bismuth in the specified amount may serve to improve mechanical properties through solid solution strengthening. Bismuth may also act to improve creep resistance. Bismuth may also improve wetting and spread.

In a preferred embodiment, the solder alloy consists of from 6 to 8 wt. % bismuth, from 4 to 6 wt. % indium, from 1 to 3 wt. % gallium and the balance tin together with any unavoidable impurities.

In a preferred embodiment, the solder alloy consists of from 6 to 8 wt. % bismuth, from 5 to 7 wt. % indium, from 1 to 3 wt. % gallium and the balance tin together with any unavoidable impurities.

The solder alloy of either aspect is preferably capable of reflowing at a temperature at least 10° C. lower than tin-bismuth alloy or tin-bismuth-silver eutectic alloy.

The solder alloy of either aspect is preferably in the form of a bar, a stick, a solid or flux cored wire, a foil or strip, a film, a preform, a powder or paste (powder plus flux blend), or solder spheres for use in ball grid array joints or chip scale packages, or other pre-formed solder pieces, with or without a flux core or a flux coating.

In a further aspect, the present invention provides a solder alloy comprising:
  from 1 to 10 wt. % indium;
  at least one of:
    from 0.1 to 5 wt. % gallium,
    from 0.1 to 5 wt. % zinc,
    from 0.1 to 2 w. % copper,
    from 0.01 to 0.1 wt. % cobalt,
    from 0.1 to 2 wt. % silver,
    from 0.005 to 0.05 wt. % titanium, and
    from 0.01 to 1 wt. % nickel;
  optionally one or more of:
    up to 1 wt. % vanadium,
    up to 1 wt. % rare earth metals,
    up to 1 wt. % neodymium,
    up to 1 wt. % chromium,
    up to 1 wt. % iron,
    up to 1 wt. % aluminium, up to 1 wt. % phosphorus,
up to 1 wt. % gold,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt. % magnesium,
up to 1 wt. % silicon, and
up to 1 wt. % manganese; and
the balance tin together with any unavoidable impurities.

For the avoidance of doubt, the advantages and preferable features (e.g. the elements and element contents) of the first aspect apply also to this aspect.

In a further aspect, the present invention provide the following alloy composition:
(a) from 48 to 57 wt. % of Bi
(b) from 1 to 10 wt % of In
(c) one or more of
  0 to 1 wt. % nickel, e.g. 0<wt. % nickel≤1
  0 to 1 wt. % of copper, e.g. 0<wt. % copper≤1
  0 to 5 wt % of silver, e.g. 0<wt. % silver≤1
(d) Optionally one or more of the following elements
  up to 1 wt. % of titanium
  up to 2 wt. % of one or more rare earths, cerium, lanthanum,
  neodymium, e.g. up to 2 wt. %
  up to 1 wt. % of chromium
  up to 10 wt. % of germanium
  up to 1 wt. % gallium
  up to 1 wt. % cobalt
  up to 1 wt. % of iron
  up to 10 wt. % of aluminum
  up to 1 wt. % of phosphorus
  up to 1 wt. % of gold
  up to 1 wt. % of tellurium
  up to 1 wt. % of selenium
  up to 1 wt. % of calcium
  up to 1 wt. % of vanadium
  up to 1 wt. % of molybdenum
  up to 1 wt. % of platinum
  up to 1 wt. % of magnesium
  up to 1 wt. % of silicon
(e) the balance tin, together with unavoidable impurities.

For the avoidance of doubt, the advantages and preferable features (e.g. the elements and element contents) of the first aspect apply also to this aspect.

In a further aspect, the present invention provide the following alloy composition:
(a) from 48 to 57 wt. % of Bi
(b) from 1 to 10 wt % of In
(c) one or more of
  0 to 1 wt. % nickel
  0 to 1 wt. % of copper
  0 to 5 wt % of cobalt
(d) Optionally one or more of the following elements
  up to 1 wt. % of titanium
  up to 2 wt. % of one or more rare earths, cerium, lanthanum, neodymium
  up to 1 wt. % of chromium
  up to 10 wt. % of germanium
  up to 1 wt. % gallium
  up to 1 wt. % of iron
  up to 10 wt. % of aluminium
  up to 1 wt. % of phosphorus
  up to 1 wt. % of gold
  up to 1 wt. % of tellurium
  up to 1 wt. % of selenium
  up to 1 wt. % of calcium
  up to 1 wt. % of vanadium
  up to 1 wt. % of molybdenum
  up to 1 wt. % of platinum
  up to 1 wt. % of magnesium
  up to 1 wt. % of silicon
  up to 1 wt. % of molybdenum
  up to 5 wt % of silver
(d) the balance tin, together with unavoidable impurities.

For the avoidance of doubt, the advantages and preferable features (e.g. the elements and element contents) of the first aspect apply also to this aspect.

In a further aspect, the present invention provide the following alloy composition:
(a) from 40 to 60 wt. % of Bi
(b) from 40 to 60 wt % of In
(c) one or more of
  0 to 1 wt. % nickel
  0 to 1 wt. % of copper
  0 to 1 wt % of cobalt
(d) Optionally one or more of the following elements
  up to 1 wt. % of titanium
  up to 2 wt. % of one or more rare earths, cerium, lanthanum, neodymium
  up to 1 wt. % of chromium
  up to 10 wt. % of germanium
  up to 1 wt. % gallium
  up to 1 wt. % of iron
  up to 10 wt. % of aluminium
  up to 1 wt. % of phosphorus
  up to 1 wt. % of gold
  up to 1 wt. % of tellurium
  up to 1 wt. % of selenium
  up to 1 wt. % of calcium
  up to 1 wt. % of vanadium
  up to 1 wt. % of molybdenum
  up to 1 wt. % of platinum
  up to 1 wt. % of magnesium
  up to 1 wt. % of silicon
  up to 1 wt. % of molybdenum
  up to 5 wt % of silver
(d) the balance tin, together with unavoidable impurities.

For the avoidance of doubt, the advantages and preferable features (e.g. the elements and element contents) of the first aspect apply also to this aspect.

In a further aspect, the present invention provides a soldered joint comprising a solder alloy as described herein.

In a further aspect, the present invention provides a solder paste comprising: the solder alloy as described herein, and a solder flux.

In a further aspect, the present invention provides a solder paste comprising:
a solder alloy, and
a solder flux comprising an activator,
wherein the activator comprises both an organic acid activator and an organic amine activator, and wherein the molar ratio of organic acid activator to organic amine activator is from 0.8 to 2.5.

Advantageously, it has been found that he solder paste exhibits printing performance suitable for SMT applications. The solder paste may also be stable at room temperature. When used in soldering, acceptable coalescence of solder particles below a 180° C. reflow temperature may be observed. Furthermore, the paste may exhibit high electrical reliability and may satisfy electrical testing (SIR) requirements.

Without being bound by theory, it is considered that such favourable characteristics are provided by controlling the molar ratio of organic acid activator to organic amine activator. In particular, it is considered that as a result of such control the solder paste exhibits adequate activity at low temperatures without any significant decrease, typically no significant decrease, in the soldering properties in comparison to conventional solder pastes. Accordingly, the solder paste is both stable and can be used to provide a high reliability solder joint.

Such favourable properties may be exhibited even when the solder alloy comprises bismuth and/or indium. This is surprising since such metals have the tendency to oxidise readily and tend to adversely react with the paste flux, even when stored at low or ambient temperatures.

In the solder paste the solder alloy is typically in the form of a powder.

The molar ratio of organic acid activator to organic amine activator is preferably from 1 to 2. When such a ratio is employed, the solder paste is particularly stable and is particularly suitable for providing a high reliability solder joint.

The solder paste preferably comprises:
from 78 to 92 wt. % of the solder alloy; and
from 8 to 22 wt. % of the solder flux.

Such amounts of solder alloy and solder flux may provide a combination of particularly favourable rheology characteristics and particularly favourable sintering characteristics.

The solder flux preferably comprises from 12 to 20 wt. % of the activator based on the total weight of the solder flux. Such amounts of activator may provide a combination of particularly favourable rheology characteristics and particularly favourable sintering characteristics The solder flux preferably comprises one or more of:
one or more rosins and/or one or more resins, preferably in an amount of from 25 to 40 wt. %;
one or more solvents, preferably in an amount of from 20 to 40 wt. %;
one or more additives, preferably in an amount of from 4 to 12 wt. %;
one or more rheology modifying agents, preferably in an amount of from 1 to 10 wt. %; and
one or more corrosion inhibitors, preferably in an amount of from 0.5 to 3 wt. %.

The paste flux plays a crucial role to control the viscosity, rheology, tack and slumping performance of the solder paste that is vital for printing and SMT application process. The rosin and/or resin may achieve such rheological properties of the solder paste. Non-limiting examples of rosin/resins are gum rosin, hydrogenated rosins, esterified rosins, modified rosin resin or dimerized rosins, with varied degree of softening points and acid values. The solvent (typically a combination of solvents) is typically selected to facilitate evaporation of solvents before solidification of solders. Typical solvent compositions include, for example, glycols, glycol esters, glycol ethers and combinations thereof. Non-limiting examples includes, hexyl carbitol, diethylene glycol dibutyl ether and tripropyleneglycol monobutyl ether. Examples of suitable rheology modifiers include, but are not limited to, those available under the tradenames THIXIN-R, Crayvallac-Super, Brij 35, 58, L4, O20, S100, 93, C10, O10, L23, O10, S10 and S20. Additives can be used alone or in a mixture. Non-limiting examples of additives include organic molecules, polymers, surfactants and inorganic materials to improve the functional features or the rheological properties of the solder paste and residue characteristics of the solder paste after coalescence. Additionally, surfactants may also be used to control the rheological or other functional properties of solder paste. Surfactants may be anionic, cationic or non-ionic surfactants. Non-limiting examples include surfactants available under the tradenames SPAN-80, SPAN-20, Tween-80, Triton-X-100, Sorbitan, IGEPAL-CA-630, Nonidet P-40, Cetyl alcohol, FS-3100, FS-2800, FS-2900. FS-230, FS-30.

The organic acid activator preferably comprises one or more di-carboxylic acids, one or more mono-carboxylic acids, one or more halo-benzoic acids, and combinations thereof, preferably one or more of phenylsuccinic acid, glutaric acid, adipic acid, suberic acid, sebacic acid, brassylic acid, maleic acid, phenylglutaric acid, dodecandioic acid, diglycolic acid and 2-iodobenzoic acid.

The organic amine activator preferably comprises one or more aliphatic- or aromatic-containing primary, secondary or tertiary amines, heterocyclic amines, polyamines solely, and combinations thereof, preferably one or more of benzimidazole, 2-ethylimidazole, diphenylguanidine, triethanolamine, benzotriazole and tolyltriazole.

The activator preferably further comprises one or more amino acid activators. The amino acid activator preferably comprises one or more of glutamic acid, aspartic acid, phenylalanine, valine, tyrosine and tryptophan. Amino acid activators are particularly effective activators. The amino acid activator is not counted in the molar ratio of organic acid activators to organic amine activators.

In a preferred embodiment, the activator comprises:
from 1 to 5 wt. % glutaric acid,
from 5 to 12 wt. % adipic acid,
from 0 to 2 wt. % 2-iodobenzoic acid (e.g. 0 wt. % or greater than 0 to 2 wt. %, such as 0.1 to 2 wt. %), and
from 2 to 10 wt. % 2-ethylimidazole.

In a preferred embodiment, the activator comprises:
from 7 to 15 wt. % adipic acid,
from 0 to 2 wt. % 2-iodobenzoic acid (e.g. 0 wt. % or greater than 0 to 2 wt. %, such as 0.1 to 2 wt. %), and
from 2 to 10 wt. % 2-ethylimidazole.

In a preferred embodiment, the activator comprises:
from 1 to 5 wt. % glutaric acid,
from 1 to 10 wt. % glutamic acid,
from 3 to 10 wt. % adipic acid,
from 0 to 2 wt. % 2-iodobenzoic acid (e.g. 0 wt. % or greater than 0 to 2 wt. %, such as 0.1 to 2 wt. %), and
from 2 to 10 wt. % 2-ethylimidazole.

The solder flux preferably comprises:
one or more thermoplastic polymers, preferably selected from polyester, poly acrylates and poly phenoxy resins; and/or
one or more waxes, preferably selected from vegetable oil waxes and natural waxes; and/or
one or more thermoset network forming resins, preferably selected from resins containing polyester or polyacrylate or polyurethane backbones, the product of the reaction of epoxy with hardeners such as amine, acid, anhydrides, the product of the reaction of acid or its derivative with amine, the product of the reaction of acid or its derives with alcohol, the product of the reaction of multiple carbon-carbon bond having allyl, vinyl, methacrylate, methacrylamide functionality, the reaction of hydroxy and isocyanate.

For low-temperature soldering paste, post coalescence electrical reliability is often very challenging. As the reflow temperature is often lower as compared to decomposition of paste flux residue, it contaminates with residual acid, amine or any other ionic impurities. These residues conduct significant electrical charges when test bias voltages are applied in the presence of moisture and temperature combinations during a Surface Insulation Test (SIR test). Such problems may be overcome by including one or more of the thermoplastic polymers, waxes and thermoset network forming resins. Without being bound by theory, it is considered that such species may form three-dimensional thermosetting resin networks and, as a result, may help the post-reflowed residues to solidify and trap residual imputers.

Preferably the solder flux further comprises a corrosion inhibitor, preferably comprising a triazole derivative, more preferably comprising one or more of benzotriazole, tolyltriazole, and carboxybenzotriazole. The presence of such corrosion inhibitors may help to protect the resulting solder joint during ambient storage or during electrical or thermal reliability testing conditions.

The solder alloy preferably comprises bismuth and/or indium. This provides a combination of the favourable features of the paste and the favourable feature of bismuth and/or indium, since the paste is stable enough to cope with the presence of indium and/or bismuth.

The solder alloy preferably comprises (or is) the solder alloy described herein.

In a further aspect, the present invention provides a solder paste composition including the following:
a) In and Bi containing solder alloys as described herein of (78-92 weight %) and Solder Flux of (8-22 weight %),
b) while the solder paste flux comprises of the following building blocks:
   a. Rosin/Resins (25-40 wt. %),
   b. Solvent package (20-40 wt. %),
   c. Activator package (12-20 wt. %),
   d. Additives (4-12 wt. %),
   e. Rheology modifying agents (1-10 wt. %), and
   f. Corrosion inhibitors (0.5-3 wt. %).

In a further aspect, the present invention provides a solder flux comprising an activator, wherein the activator comprises both an organic acid activator and an organic amine activator, and wherein the molar ratio of organic acid activator to organic amine activator is from 0.8 to 2.5.

In a further aspect, the present invention provides a method of forming a solder joint comprising:
(i) providing two or more work pieces to be joined;
(ii) providing a solder alloy as described herein or a solder paste as described herein; and
(iii) heating the solder alloy or solder paste in the vicinity of the work pieces to be joined.

The work pieces may be components of a printed circuit board, such as a substrate and a die.

At least one of the work pieces is preferably a polymer film, more preferably a polymer film comprising one or more of polyethylene terephthalate (PET), heat-stabilized PET, polyethylene naphthalate (PEN), heat-stabilized PEN, polyether ether ketone (PEEK), and polycarbonate (PC). Such films are particularly suitable for use in fabricating flexible printed circuit boards. In addition, these materials possess the right combination of cost, electrical and mechanical properties and world wide availability of consistent high quality films. PET films and especially heat-stabilized PET films are particularly preferred in this regard.

In a further aspect, the present invention provides use of a solder alloy as described herein or the solder paste described herein in a soldering method.

The soldering method is preferably selected from wave soldering, Surface Mount Technology (SMT) soldering, die attach soldering, thermal interface soldering, hand soldering, laser and RF induction soldering, soldering to a solar module, soldering of level 2 LED package boards, and rework soldering.

The solder alloys and solder pastes described herein may be used in a SMT type assembly on flexible polymer substrates (examples include: standard PET, heat-stabilized PET, and other polymer substrates such as, PEN, PEEK, PC, PI etc.).

The solder alloys and solder pastes described herein may be used in a hierarchical solder assembly on flexible or rigid substrates. Examples include ultra low temperature assembly (Level 2) using the solder alloys or solder pastes described herein, with use of SnBi-like (e.g. SnBi) or SAC-like (e.g. Sn—Ag—Cu) alloy for Die attach (Level 1).

The solder alloys and solder pastes described herein may be used in an ultra low temperature SMT-type assembly onto dual side rigid PCBs. For example, the first side may be soldered with off-eutectic Alpha SnBi (HRL1) or Alpha eutectic Sn-57/58Bi-0.2Cu-0.03Co (SBX02) alloy, and the second side with the alloy described herein. Both assemblies on Level 2 SMT assemblies.

The solder alloys and solder pastes described herein may be used to solder low temperature and/or heat sensitive components such as, for example, batteries, displays (e.g. OLEDs) and sensors (in particular assembly of low temperature medical sensors).

The solder alloys and solder pastes described herein may be used to prepare low temperature hermetic seals and/or for low temperature lamination.

The solder alloys and solder pastes described herein may be used in an assembly process that ensures no degradation and/or discoloration of temperature sensitive substrates and other components.

The present invention will now be described further, by way of few non-limiting examples of these alloys and a summary of their performance, with reference to the following drawings in which:

FIG. 1 shows a DSC plot (Heat Flow Q (mW) versus Temperature T (C) for the alloy Sn—Bi-6 In.

The present invention will now be described further with reference to the following non-limiting examples.

Example 1

Figure 1:
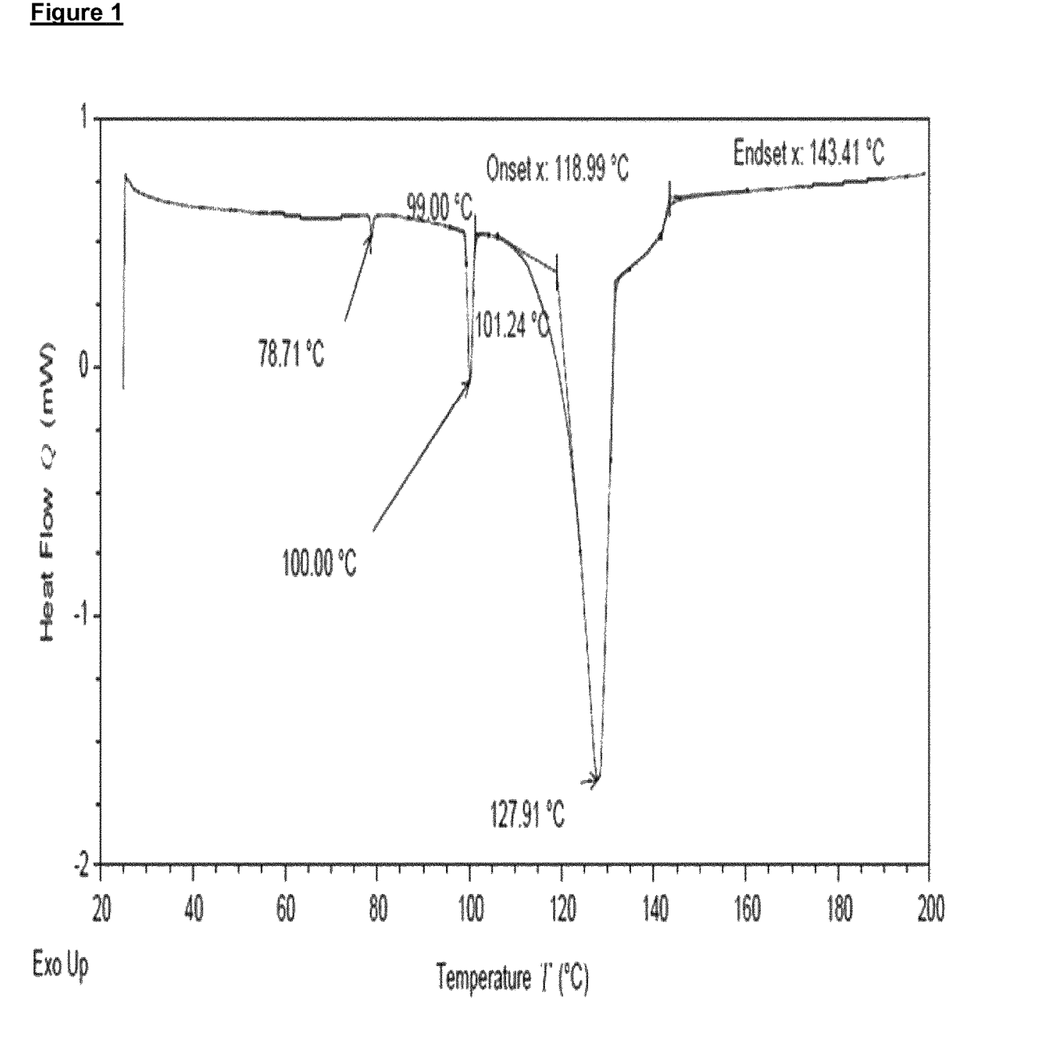
Figure 2:
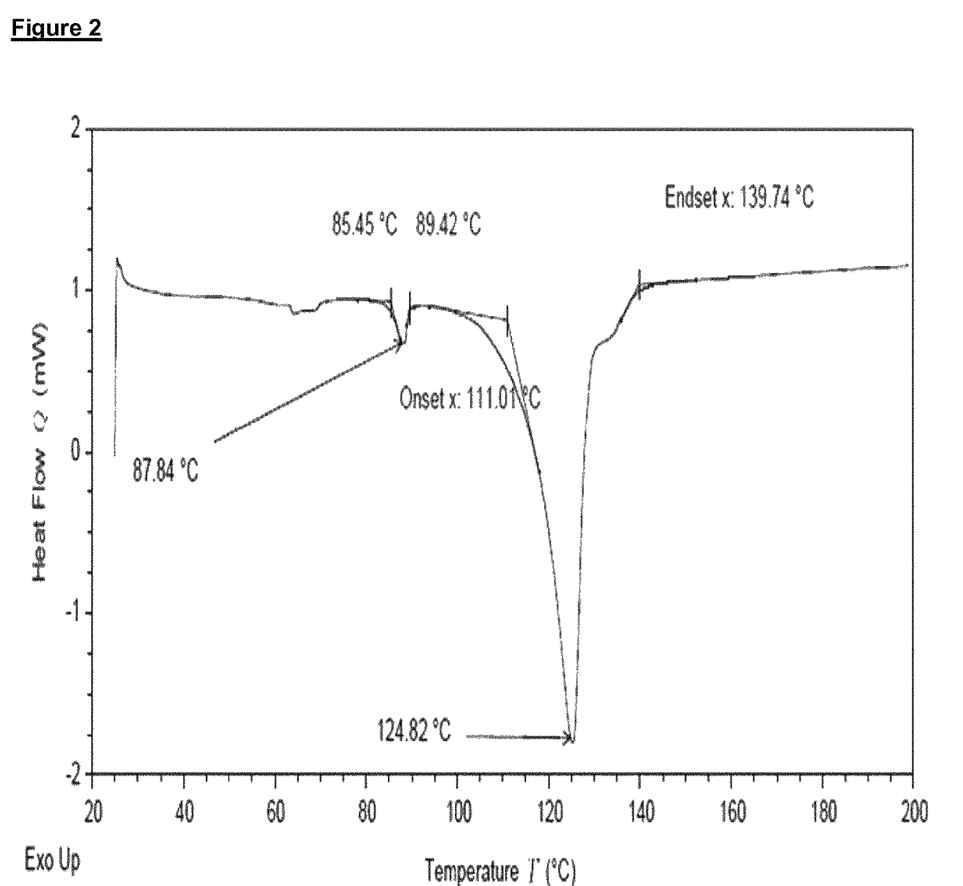
FIG. 2 shows a DSC plot (Heat Flow Q (mW) versus Temperature T (C) for the alloy Sn—Bi-6 In-1Ga.

The following solder alloys were prepared: Sn-5Bi-6 In and Sn-5Bi-6In-1Ga. As can be seen from FIGS. 1 and 2, the addition of 1% Ga to Sn-5Bi-6 In solder reduces the onset temperature of the main melting phase from 118° C. to 110° C. and eliminates phases melting at 78° C. and 100° C. It also introduces a small fraction of another phase melting around 87° C.

Solder joints were prepared using the two solder alloys. The additional of 1% Ga did not have a significant detrimental effect on the mechanical properties of the solder joint. In Particular, the alloys exhibited similar shear strengths and similar thermal cycling behaviours.

Example 2

A solder alloy was prepared having the following composition:
(a) from 53 to 54 wt. % of Bi (b) from 4 to 5 wt % of In
(c) 0 to 0.05 wt. % nickel
(d) the balance tin, together with unavoidable impurities.

The alloy exhibited a combination of low reflow temperature and favourable mechanical properties.

Example 3

A solder alloy was prepared having the following composition:
(a) from 55 to 56 wt. % of Bi
(b) from 2 to 3 wt % of In
(c) 0 to 0.05 wt. % nickel
(d) 0.3 to 0.5% Cu
(e) the balance tin, together with unavoidable impurities.

The alloy exhibited a combination of low reflow temperature and favourable mechanical properties.

Example 4

A solder alloy was prepared having the following composition:
(a) from 51 to 53 wt % of In
(b) 0 to 0.05 wt. % nickel
(c) 0.3 to 0.5% Cu
(d) the balance tin, together with unavoidable impurities.

The alloy exhibited a combination of low reflow temperature and favourable mechanical properties.

Example 5

A solder alloy was prepared having the following composition:
(a) from 51 to 53 wt % of In
(b) 0 to 0.05 wt. % nickel
(c) 0 to 0.05% Ge
(d) the balance tin, together with unavoidable impurities.

The alloy exhibited a combination of low reflow temperature and favourable mechanical properties.

Example 6

A solder alloy was prepared having the following composition:
(a) from 51 to 53 wt % of In
(b) 0 to 0.05 wt. % nickel
(c) 0 to 0.03% P
(d) the balance tin, together with unavoidable impurities.

The alloy exhibited a combination of low reflow temperature and favourable mechanical properties.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A solder paste comprising:
a solder alloy comprising:
from 40 to 65 wt. % bismuth;
from 1 to 10 wt. % indium;
at least one of:
from 0.1 to 5 wt. % gallium,
from 0.1 to 5 wt. % zinc,
from 0.1 to 2 w. % copper,
from 0.01 to 0.1 wt. % cobalt,
from 0.1 to 2 wt. % silver,
from 0.005 to 0.05 wt. % titanium, and
from 0.01 to 1 wt. % nickel;
optionally one or more of:
up to 1 wt. % vanadium,
up to 1 wt. % rare earth metals,
up to 1 wt. % neodymium,
up to 1 wt. % chromium,
up to 1 wt. % iron,
up to 1 wt. % aluminium,
up to 1 wt. % phosphorus,
up to 1 wt. % gold,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt. % magnesium,
up to 1 wt. % silicon, and
up to 1 wt. % manganese; and
the balance tin together with any unavoidable impurities; and
a solder flux;
wherein the solder flux comprises an activator;
wherein the activator comprises an organic acid activator and an organic amine activator, and the molar ratio of organic acid activator to organic amino activator is from 0.8 to 2.5; and
wherein the activator comprises:
from 1 to 5 wt. % glutaric acid,
from 5 to 12 wt. % adipic acid,
from 0 to 2 wt. % 2-iodobenzoic acid, and
from 2 to 10 wt. % 2-ethylimidazole.

2. The solder paste of claim 1, wherein the solder alloy comprises:
from 42 to 60 wt. % bismuth; and/or
1.5 to 9 wt. % indium; and/or
from 0.5 to 4 wt. % gallium; and/or
from 0.5 to 4 wt. % zinc; and/or
from 0.15 to 1.5 wt. % copper; and/or
from 0.02 to 0.09 wt. % cobalt; and/or
from 0.2 to 1.5 wt. % silver; and/or
from 0.01 to 0.04 wt. % titanium; and/or
from 0.02 to 0.9 wt. % nickel.

3. The solder paste of claim 1, wherein the solder alloy comprises:
from 0.001 to 1 wt. % vanadium; and/or
from 0.001 to 1 wt. % rare earth metals or from 0.001 to 1 wt. % neodymium; and/or
from 0.001 to 1 wt. % chromium; and/or
from 0.001 to 1 wt. % iron; and/or
from 0.001 to 1 wt. % aluminium; and/or
from 0.001 to 1 wt. % phosphorus; and/or
from 0.001 to 1 wt. % gold; and/or
from 0.001 to 1 wt. % tellurium; and/or
from 0.001 to 1 wt. % selenium; and/or
from 0.001 to 1 wt. % calcium; and/or
from 0.001 to 1 wt. % molybdenum; and/or
from 0.001 to 1 wt. % platinum; and/or
from 0.001 to 1 wt. % magnesium; and/or
from 0.001 to 1 wt. % silicon; and/or
from 0.001 to 1 wt. % manganese.

4. A solder alloy consisting of:
from 50 to 54 wt. % bismuth, from 4 to 6 wt. % indium, from 0.5 to 1.5 wt. % gallium and the balance tin together with any unavoidable impurities; or from 49 to 53 wt. % bismuth, from 5 to 7 wt. % indium, from 0.5 to 1.5 wt. % gallium and the balance tin together with any unavoidable impurities; or from 49 to 53 wt. % bismuth, from 4 to 6 wt. % indium, from 1.5 to 2.5 wt. % gallium and the balance tin together with any unavoidable impurities; or from 56 to 59 wt. % bismuth, from 0.1 to 0.3 wt. % copper, from 0.02 to 0.04 cobalt, from 2 to 4 wt. % indium and the balance tin together with any unavoidable impurities; or from 56 to 59 wt. % bismuth, from 0.1 to 0.3 wt. % copper, from 0.02 to 0.04 cobalt, from 4 to 6 wt. % indium, from 1 to 3 wt. % gallium and the balance tin together with any unavoidable impurities; or from 56 to 59 wt. % bismuth, from 0.2 to 0.6 wt. % silver, from 4 to 6 wt. % indium, from 1 to 3 wt. % gallium and the balance tin together with any unavoidable impurities.

5. The solder alloy of claim 4, wherein the solder alloy is capable of reflowing at a temperature at least 10° C. lower than a tin-bismuth alloy or tin-bismuth-silver eutectic alloy; and/or wherein the solder alloy is in the form of a bar, a stick, a solid or flux cored wire, a foil or strip, a film, a preform, a powder or paste (powder plus flux blend), or solder spheres for use in ball grid array joints or chip scale packages, or other pre-formed solder pieces, with or without a flux core or a flux coating.

6. A method of soldering comprising using the solder alloy of claim 4.

7. The method of claim 6, wherein the soldering comprises a soldering method selected from the group consisting of wave soldering, Surface Mount Technology (SMT) soldering, die attach soldering, thermal interface soldering, hand soldering, laser and RF induction soldering, soldering to a solar module, soldering of level 2 LED package boards, and rework soldering.

8. The solder alloy of claim 4, wherein the solder alloy consists of:
from 50 to 54 wt. % bismuth, from 4 to 6 wt. % indium, from 0.5 to 1.5 wt. % gallium and the balance tin together with any unavoidable impurities.

9. The solder alloy of claim 4, wherein the solder alloy consists of:
from 49 to 53 wt. % bismuth, from 5 to 7 wt. % indium, from 0.5 to 1.5 wt. % gallium and the balance tin together with any unavoidable impurities.

10. The solder alloy of claim 4, wherein the solder alloy consists of:
from 49 to 53 wt. % bismuth, from 4 to 6 wt. % indium, from 1.5 to 2.5 wt. % gallium and the balance tin together with any unavoidable impurities.

11. A solder paste comprising:
the solder alloy of claim 4, and
a solder flux.

12. The solder paste of claim 11, wherein the solder paste comprises:
from 78 to 92 wt. % of the solder alloy; and
from 8 to 22 wt. % of the solder flux.

13. The solder paste of claim 11, wherein the solder flux comprises:
one or more thermoplastic polyme and/or
one or more waxes; and/or
one or more thermoset network forming resins.

14. The solder paste of claim 11, wherein the solder flux further comprises a corrosion inhibitor.

15. The solder paste of claim 11, wherein the solder flux comprises one or more of:

one or more rosins and/or one or more resins;
one or more solvents;
one or more additives;
one or more rheology modifying agen and
one or more corrosion inhibitors.

16. The solder paste of claim 15, wherein the solder flux comprises one or more of:
from 25 to 40 wt. % of the one or more rosins and/or one or more resins;
from 20 to 40 wt. % of the one or more solvents;
from 4 to 12 wt. % of the one or more additives;
from 1 to 10 wt. % of the one or more rheology modifying agents; and
from 0.5 to 3 wt. % of the one or more corrosion inhibitors.

17. The solder paste of claim 11,
wherein the solder flux comprises an activator,
wherein the activator comprises an organic acid activator and an organic amine activator, and
wherein the molar ratio of organic acid activator to organic amino activator is from 0.8 to 2.5.

18. The solder paste of claim 17, wherein the molar ratio of organic acid activator to organic amine activator is from 1 to 2; and/or
wherein the solder flux comprises from 12 to 20 wt. % of the activator based on the total weight of the solder flux.

19. The solder paste of claim 17, wherein:
the organic acid activator comprises one or more di-carboxylic acids, one or more mono-carboxylic acids, one or more halo-benzoic acids, or combinations thereof; and/or
the organic amine activator comprises one or more aliphatic- or aromatic-containing primary, secondary or tertiary amines, heterocyclic amines, polyamines solely, or combinations thereof.

20. The solder alloy of claim 17, wherein the activator further comprises one or more amino acid activators.

21. The solder alloy of claim 20, wherein the amino acid activator comprises one or more of glutamic acid, aspartic acid, phenylalanine, valine, tyrosine and tryptophan.

22. A solder paste comprising:
a solder alloy comprising:
from 40 to 65 wt. % bismuth;
from 1 to 10 wt. % indium;
at least one of:
from 0.1 to 5 wt. % gallium,
from 0.1 to 5 wt. % zinc,
from 0.1 to 2 w. % copper,
from 0.01 to 0.1 wt. % cobalt,
from 0.1 to 2 wt. % silver,
from 0.005 to 0.05 wt. % titanium, and
from 0.01 to 1 wt. % nickel;
optionally one or more of:
up to 1 wt. % vanadium,
up to 1 wt. % rare earth metals,
up to 1 wt. % neodymium,
up to 1 wt. % chromium,
up to 1 wt. % iron,
up to 1 wt. % aluminium,
up to 1 wt. % phosphorus,
up to 1 wt. % gold,
up to 1 wt. % tellurium,
up to 1 wt. % selenium,
up to 1 wt. % calcium,
up to 1 wt. % vanadium,
up to 1 wt. % molybdenum, up to 1 wt. % platinum,
up to 1 wt. % magnesium,
up to 1 wt. % silicon, and
up to 1 wt. % manganese; and
the balance tin together with any unavoidable impurities; and
a solder flux;
wherein the solder flux comprises an activator;
wherein the activator comprises an organic acid activator and an organic amine activator, and the molar ratio of organic acid activator to organic amino activator is from 0.8 to 2.5; and
wherein the activator comprises:
from 7 to 15 wt. % adipic acid,
from 0 to 2 wt. % 2-iodobenzoic acid, and
from 2 to 10 wt. % 2-ethylimidazole.

23. A solder paste comprising:
a solder alloy comprising:
from 40 to 65 wt. % bismuth;
from 1 to 10 wt. % indium;
at least one of:
from 0.1 to 5 wt. % gallium,
from 0.1 to 5 wt. % zinc,
from 0.1 to 2 w. % copper,
from 0.01 to 0.1 wt. % cobalt,
from 0.1 to 2 wt. % silver,
from 0.005 to 0.05 wt. % titanium, and
from 0.01 to 1 wt. % nickel;
optionally one or more of:
up to 1 wt. % vanadium,
up to 1 wt. % rare earth metals,
up to 1 wt. % neodymium,
up to 1 wt. % chromium,
up to 1 wt. % iron,
up to 1 wt. % aluminium,
up to 1 wt. % phosphorus,
up to 1 wt. % gold,
up to 1 wt. % tellurium,
up to 1 wt. % selenium,
up to 1 wt. % calcium,
up to 1 wt. % vanadium,
up to 1 wt. % molybdenum,
up to 1 wt. % platinum,
up to 1 wt. % magnesium,
up to 1 wt. % silicon, and
up to 1 wt. % manganese; and
the balance tin together with any unavoidable impurities; and
a solder flux;
wherein the solder flux comprises an activator;
wherein the activator comprises an organic acid activator and an organic amine activator, and the molar ratio of organic acid activator to organic amino activator is from 0.8 to 2.5; and
wherein the activator comprises:
from 1 to 5 wt. % glutaric acid,
from 1 to 10 wt. % glutamic acid,
from 3 to 10 wt. % adipic acid,
from 0 to 2 wt. % 2-iodobenzoic acid, and
from 2 to 10 wt. % 2-ethylimidazole.

\* \* \* \* \*